(12) United States Patent
Fabre et al.

(10) Patent No.: US 12,454,106 B2
(45) Date of Patent: Oct. 28, 2025

(54) PRODUCTION OF A COMPOSITE CASING FOR AN AIRCRAFT TURBINE ENGINE

(71) Applicant: SAFRAN AIRCRAFT ENGINES, Paris (FR)

(72) Inventors: Hubert Jean Marie Fabre, Moissy-Cramayel (FR); Maxime Guillot, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 210 days.

(21) Appl. No.: 18/000,888

(22) PCT Filed: Jun. 15, 2021

(86) PCT No.: PCT/FR2021/051071
§ 371 (c)(1),
(2) Date: Dec. 6, 2022

(87) PCT Pub. No.: WO2021/255380
PCT Pub. Date: Dec. 23, 2021

(65) Prior Publication Data
US 2023/0311433 A1    Oct. 5, 2023

(30) Foreign Application Priority Data

Jun. 19, 2020 (FR) .................................. 2006427

(51) Int. Cl.
*B29C 70/54* (2006.01)
*B29C 70/32* (2006.01)
*B29L 31/00* (2006.01)

(52) U.S. Cl.
CPC ............ *B29C 70/541* (2013.01); *B29C 70/32* (2013.01); *B29C 70/545* (2013.01);
(Continued)

(58) Field of Classification Search
CPC ...................................................... B29C 70/32
See application file for complete search history.

(56) References Cited

U.S. PATENT DOCUMENTS 9,987,806 B2 *   6/2018  Halford ................... B29C 53/82
2014/0202300 A1 * 7/2014  Mathon .................. B29C 70/545
                                                                156/353
2014/0302186 A1  10/2014  Mathon et al.

FOREIGN PATENT DOCUMENTS

FR          2995555 A1 *  3/2014  ......... B29C 53/8041
WO       2013/017796 A1    2/2013

OTHER PUBLICATIONS

Machine translation of FR-2995555-A1, Mar. 21, 2014 (Year: 2014).*

(Continued)

*Primary Examiner* — Benjamin A Schiffman
(74) *Attorney, Agent, or Firm* — WOMBLE BOND DICKINSON (US) LLP

(57) ABSTRACT

Method for producing a casing made of a composite material for an aircraft turbine engine, the casing having an annular shape and including an annular fibrous preform formed by winding a fibrous cloth soaked in a polymer matrix, the method including the steps of: a) positioning an edge of the cloth on a molding drum, this cloth having a generally elongate shape and the edge being located at a first longitudinal end of the cloth, b) winding the cloth on the drum, over at least one rotation, so as to obtain the preform wound around the drum, c) molding of the preform and hardening of the resin which is injected into the preform or pre-impregnated on the preform, wherein the method includes, before step a), a step i) of mounting a removable stop on the drum, and in that step a) includes abutting the edge against this stop.

10 Claims, 5 Drawing Sheets

(52) U.S. Cl.
CPC ............. *B29C 2793/0081* (2013.01); *B29L 2031/7504* (2013.01); *Y02T 50/60* (2013.01)

(56) References Cited

OTHER PUBLICATIONS

International Search Report received for PCT Patent Application No. PCT/FR2021/051071, mailed on Sep. 20, 2021, 6 pages (3 pages of English Translation and 3 pages of Original Document).

* cited by examiner

PRODUCTION OF A COMPOSITE CASING FOR AN AIRCRAFT TURBINE ENGINE

FIELD OF THE INVENTION

The invention relates to a method and an installation for producing a casing made of a composite material for an aircraft turbine engine.

BACKGROUND OF THE INVENTION

The prior art comprises, in particular, the documents US-A1-2014/302186 and WO-A1-2013/017796.

FIG. 1 partially represents a fan 1 of an aircraft turbine engine.

Conventionally, an aircraft turbine engine comprises, from upstream to downstream, i.e., in the direction of flow of the gas flow, a fan, one or more compressors, a combustion chamber, one or more turbines, and a nozzle for ejecting the combustion gases leaving the turbine or turbines.

The fan 1 comprises a wheel 2 with vanes which is surrounded by a fan casing 3, also known as a retention casing because of its function of retaining the vanes in the event of their breakage, or in the event of debris entering the fan.

The fan casing 3 typically comprises an annular envelope 9 of axis of revolution A which extends around the fan vanes 2 of the turbine engine. This envelope comprises an annular fastening flange 3', 3" at each of its axial ends. These flanges 3', 3" are used to secure the casing 3 to annular walls of the nacelle of the turbine engine.

The fan casing 3 is in fact connected, upstream, to an air inlet duct 5, and, downstream, to an intermediate casing shell 6. The casing also carries upstream acoustic panels 7 and downstream acoustic panels 8. The fan casing 3 further comprises an annular layer 4 of abradable material, positioned on an inner annular surface of the envelope 9, between the upstream panels 7 and the downstream panels 8.

In addition to the retention function, the fan casing 3 is also designed to:
ensure continuity of the aerodynamic vein through the annular layer of abradable material;
ensure mechanical continuity (of forces and moments) between the air inlet duct 5 and the intermediate casing shell 6;
allow the attachment of the panels 7, 8 and the layer 4,
allow the attachment of equipment and supports known per se;
meet the fire and leakage regulation specifications;
allow continuity of electrical current for lightning resistance, etc.

In a known way, the envelope 9 or the casing 3 can be made of a composite material. The casing 3 then comprises a woven preform 24, in the form of a strip or fabric or wound cloth 20, and a resin in which the preform is embedded. The casing 3 can then be designed by winding the cloth 20 from woven material around a drum 22, called a moulding drum, which is used after winding to form the casing by injection moulding (see FIG. 2). The preform is thus shaped around the drum 22, to form one or more turns of cloth around the drum. The mould is then closed for the injection of a resin to impregnate the preform.

The definition of a composite material casing defines a tolerance for a fibre volume ratio (VFR) to be respected in the part in order to guarantee the properties of the material, good impregnation and good cohesion of the fibres. Too high a VFR can lead to undesirable porosity and poor impregnation, which can cause poor fibre cohesion and degradation of material properties.

Winding the cloth 20 around the drum 22 is a delicate operation and can have an impact on the VFR. This is particularly the case at the beginning of the winding of the cloth 20, when the edge 20a of one longitudinal end of the cloth 20 is positioned on the drum 22. In the present technique, the drum 22 comprises a mark 26 and an operator has to align the edge 20a of the cloth 20 with this mark 26 (see FIG. 3). However, this positioning is not easy to achieve and, even if it is done correctly, the edge 20a of the cloth 20 may move during winding. This mark 26 is intended to be located in line with the preform 24. If the edge 20a of the cloth 20 is incorrectly positioned in relation to this mark 26, which is covered and hidden by the cloth 20, it will not be possible to identify and measure this incorrect positioning of the preform 24 (see FIG. 4). If the preform 24 slips during the winding process, this slippage will occur in the winding direction F and the mark 26 will be more visible. In the various cases, it is difficult to measure this possible misalignment. Indeed, even when the preform 24 is correctly positioned on the drum 20, the mark 26 is largely hidden by the preform 24 and therefore difficult to spot.

The operator therefore does not have the possibility of realising how misaligned the preform 24 is and whether or not it would be in his interest to reposition it. The operator then realises the extent of the misalignment upon demoulding and final inspection of the part, i.e., too late to correct it. A misalignment that leads to the mark being covered by the cloth results in an increase in the VFR, which may be above the upper tolerance limit in that area. On the contrary, a misalignment due to slippage of the preform in the winding direction results in a decrease of the VFR, which also has an impact on the material properties.

The invention thus aims to provide a simple, effective and economical solution to this problem and to facilitate and ensure the positioning of the cloth and preform at the start of winding.

SUMMARY OF THE INVENTION

The invention relates to a method for producing a composite material casing for an aircraft turbine engine, the casing having an annular shape and comprising an annular fibrous preform formed by winding a fibrous cloth and embedded in a polymer matrix, the method comprising the steps of:
a) positioning an edge of the cloth on a moulding drum, the cloth having a generally elongate shape and said edge being located at a first longitudinal end of the cloth,
b) winding the cloth onto the drum, over at least one turn, so as to obtain the preform wound around the drum,
c) moulding the preform and hardening the resin which is injected into the preform or pre-impregnated on the preform,
characterised in that it comprises, before step a), a step i) of mounting a removable abutment on the drum, and in that step a) comprises abutting said edge against this abutment.

The invention thus proposes to facilitate the positioning of the edge of the cloth forming the preform by means of a removable abutment. Once the abutment has been correctly positioned on the drum, the operator need only apply the edge of the cloth against this abutment to correctly position the cloth on the drum. The operator can then continue with the method of winding the cloth around the drum, while checking, for example visually, that the edge of the cloth is always still resting against the abutment. The abutment is then removed when it is no longer needed and in particular if the cloth is to be wound on itself and more than one turn on the drum.

The method according to the invention may comprise one or more of the following features or steps, considered independently of each other or in combination with each other:
- the method comprises, during step b), a step ii) of dismounting and removing the abutment from the mould;
- the drum comprises a cylindrical wall extending between two annular flanges, the abutment being positioned on the cylindrical wall and removably attached to said flanges in step i);
- the abutment comprising visual markers configured to be detected by a video camera, the method comprises, after step i), a step iii) of calibrating monitoring cameras of the winding by detecting these markers;
- the abutment comprising a cutting guide, the method comprises, at the end of step b), a step iv) of cutting a second longitudinal end opposite of the fabric;
- the abutment is made of metal, plastic, wood or composite;
- the abutment is mounted in step i) so that said edge of the fabric can be aligned with a mark located on the drum;
- the mark is an engraving.

The invention also relates to an installation for carrying out a method as described above, this installation comprising:
- the moulding drum extending around a longitudinal axis X and comprising a cylindrical wall and a mark, the cylindrical wall extending between two annular flanges and a mark, and
- the abutment positioned on the cylindrical wall and removably attached to the annular flanges of the drum, the abutment being positioned at the mark and resting against an edge of a fibrous cloth.

The invention further relates to an assembly comprising an installation for carrying out a method as described above, and a fibrous cloth, this installation comprising:
- the moulding drum extending around a longitudinal axis X and comprising a cylindrical wall and a mark, the cylindrical wall extending between two annular flanges, and
- the abutment positioned on the cylindrical wall and removably attached to the annular flanges of the drum, the abutment being positioned at the mark and resting against an edge of the fibrous cloth.

The abutment may rest against the edge in a circumferential direction of the drum (relative to the axis X).

The abutment may be made of metal, plastic, wood or composite.

The abutment may comprise visual markers configured to be detected by a video camera, and/or a cutting guide configured to cut a second longitudinal end opposite of the cloth and preform.

BRIEF DESCRIPTION OF THE FIGURES

Further features and advantages of the invention will become apparent from the following detailed description, for the understanding of which reference is made to the attached drawings in which.

DETAILED DESCRIPTION OF THE INVENTION

Figure 1:
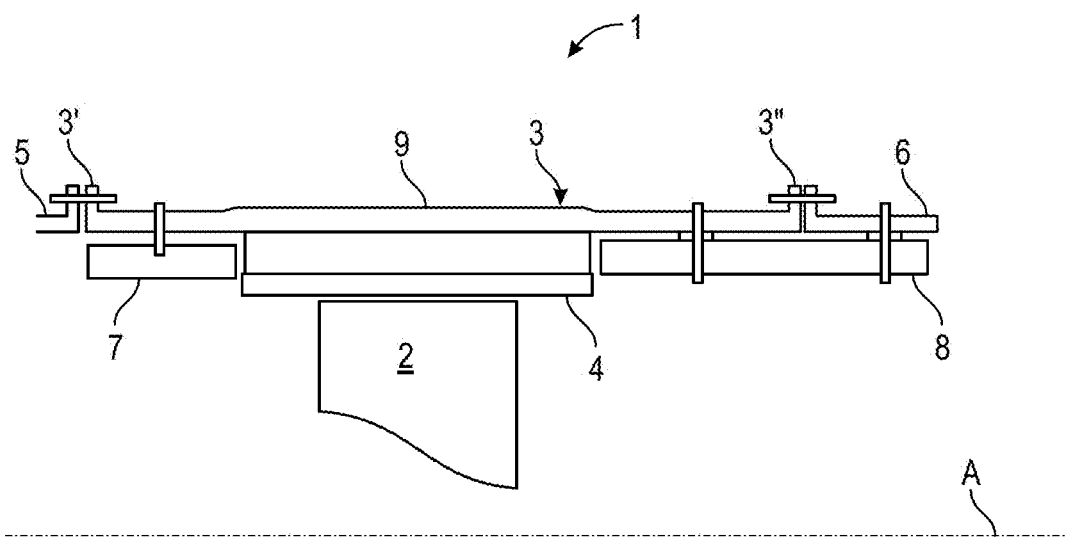
FIG. 1, already discussed, shows a partial cross-sectional view of an aircraft turbine engine fan according to the prior art.
Figure 5:
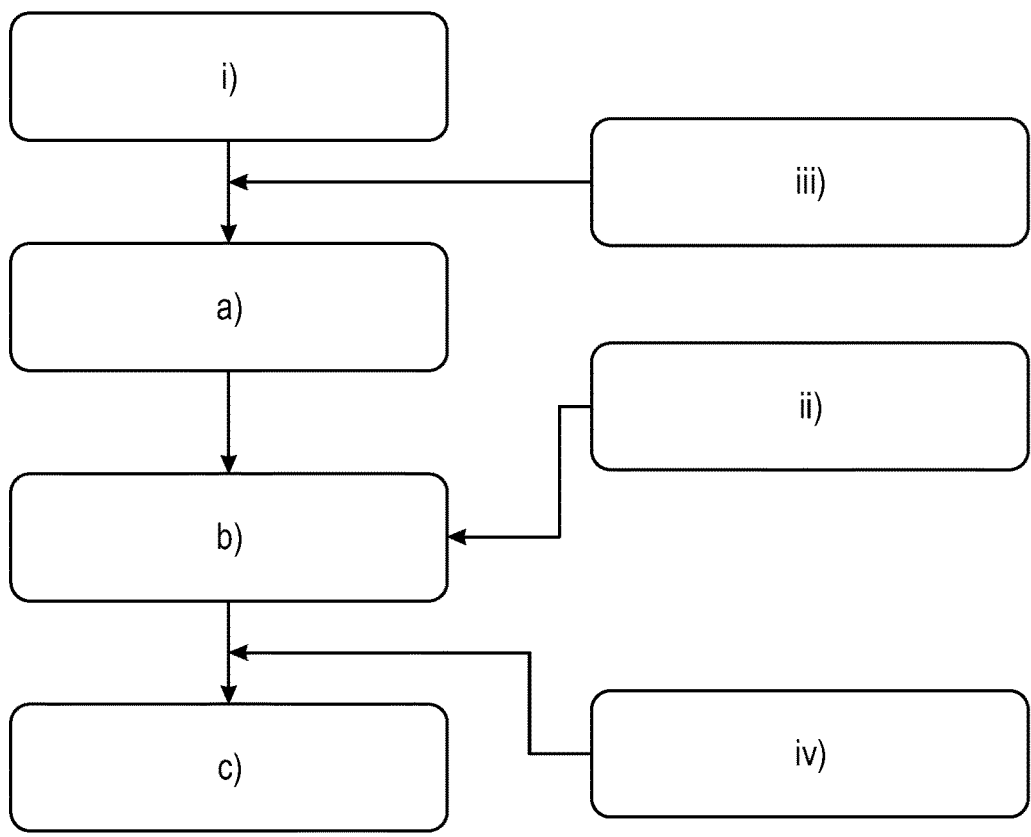
FIG. 5 is a flow chart illustrating the steps of a method for producing a composite casing according to the invention.

FIG. 5 illustrates steps in a method for producing a composite material casing 3 for an aircraft turbine engine, such as that shown in FIG. 1.

Figure 6:
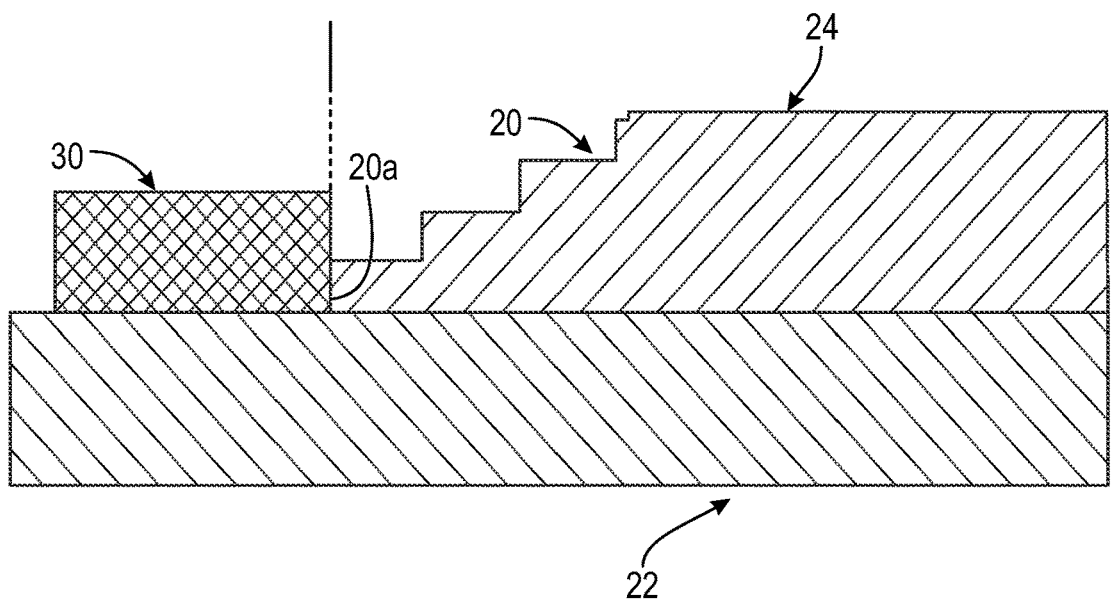
FIG. 6 is a view similar to those of FIGS. 3 and 4 and illustrates a step of the method in which a abutment is positioned on the drum to ensure proper positioning of the cloth and the preform as it is wound onto the drum.

This method essentially comprises four steps, namely:
a) mounting a removable abutment 30 on a moulding drum 22, as seen in FIG. 6,
b) positioning an edge 20a of a fibrous cloth 20 on the drum 20, this positioning being achieved by abutting this edge 20a against the abutment 30,
c) winding the cloth 20 on the drum 22 over at least one turn, so as to obtain an annular preform 24 around the drum (cf. FIG. 2), and
d) moulding the preform 24 and hardening the resin which is injected into the preform or pre-impregnated on the preform.

The cloth 20 has a generally elongate shape. The edge 20a which is applied against the abutment 30 is located at one of the longitudinal ends of the cloth 20. In the event that the cloth 20 has a generally rectangular and elongate shape, the edge 20a in question would be an edge which extends substantially perpendicular to the longitudinal or lateral edges of the cloth 20.

The abutment 30 facilitates the positioning of the edge 20a of the cloth 20 when the winding of the latter is initiated around the drum 22.

The abutment 30 is removable and intended to be dismounted and removed from the drum 22 in a step ii) which may occur, for example, during step b) (see FIG. 5).

The removal of the abutment 30 occurs at a time that depends in particular on whether the abutment 30 has other functions than the positioning of the preform 24 at the start of the winding. In any case, the abutment should normally be removed before the end of the first winding turn in order to continue the winding by covering the edge 20a of the cloth 20.

Figure 7:
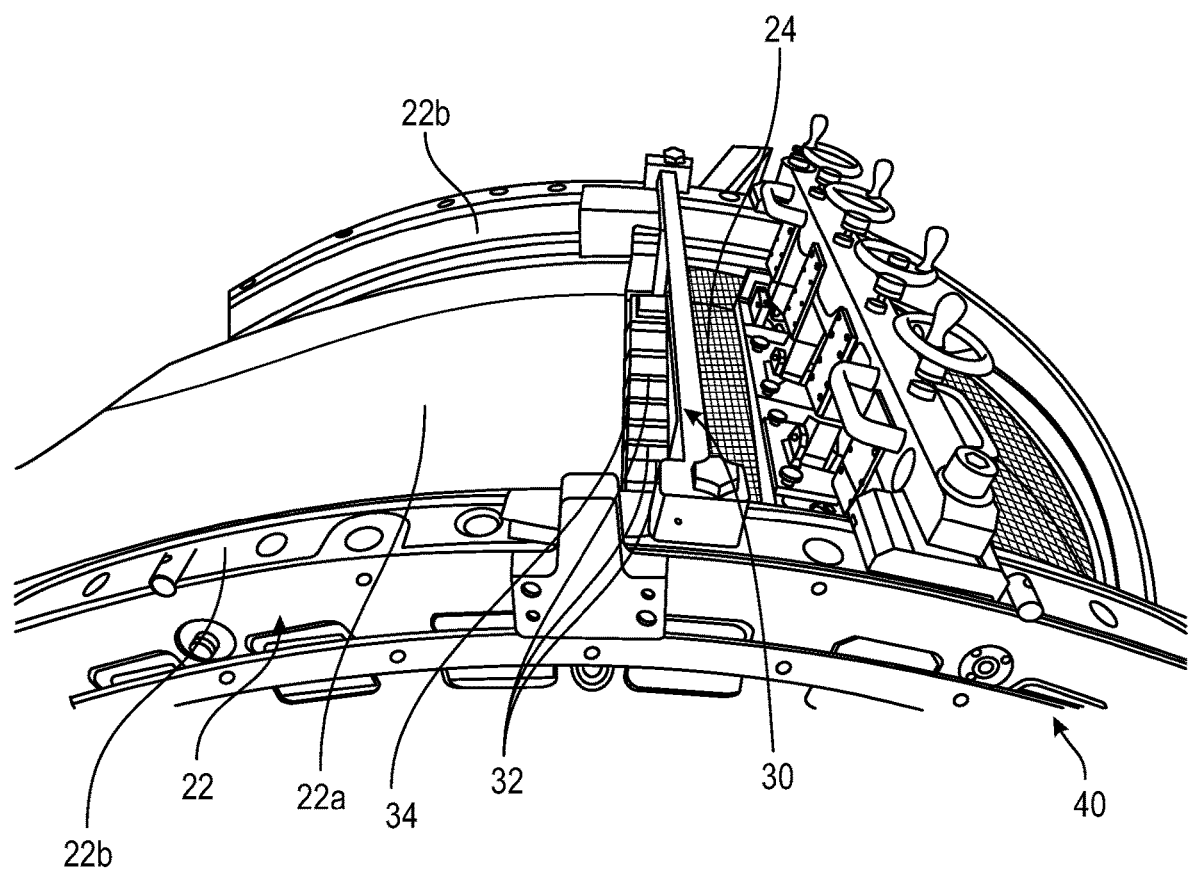
FIG. 7 is a perspective view of part of an installation for carrying out the method according to the invention.
Figure 8:
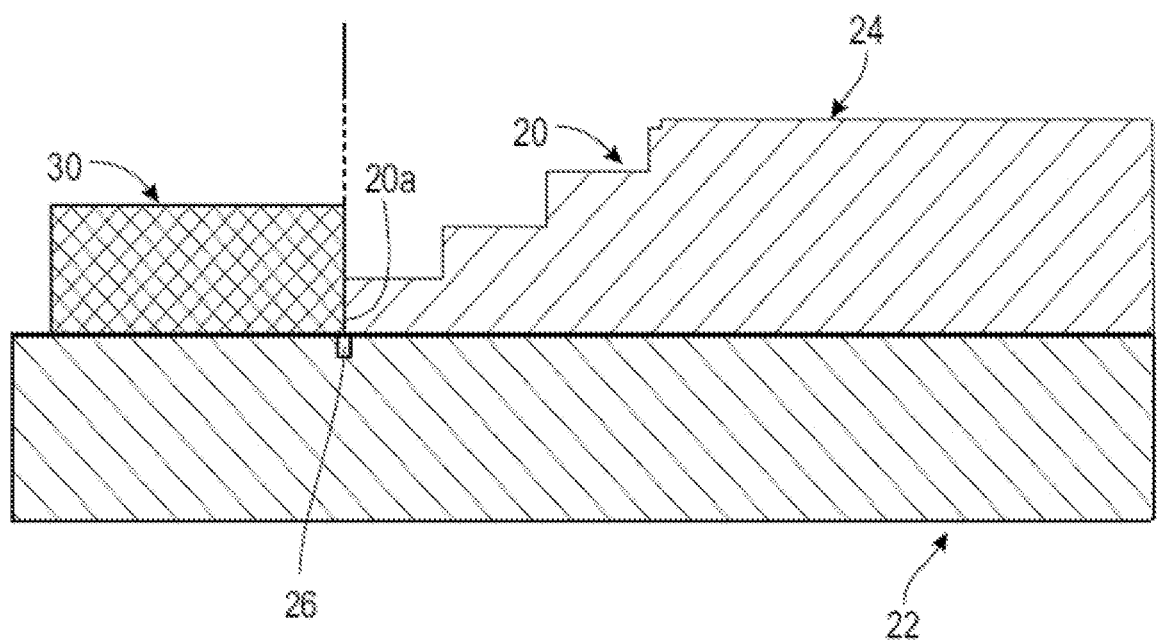
FIG. 8 is a similar view to FIG. 6 and illustrates the abutment and an edge of the cloth positioned at a mark on the drum.

FIGS. 7 and 8 illustrate an embodiment of an assembly comprising an installation 40 for carrying out the method of the invention, and the fibrous cloth 20.

In FIG. 7, the installation 40 comprises the drum 22 and the abutment 30.

Figure 2:
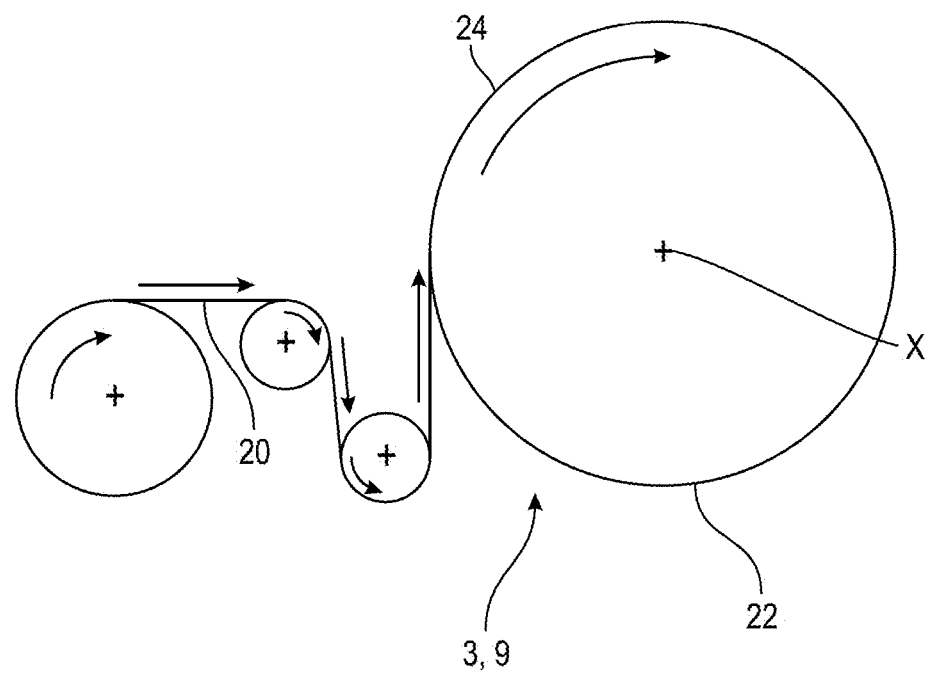
FIG. 2, also already mentioned, schematically illustrates an installation for the production of a composite casing of the type illustrated in FIG. 1.
Figure 3:
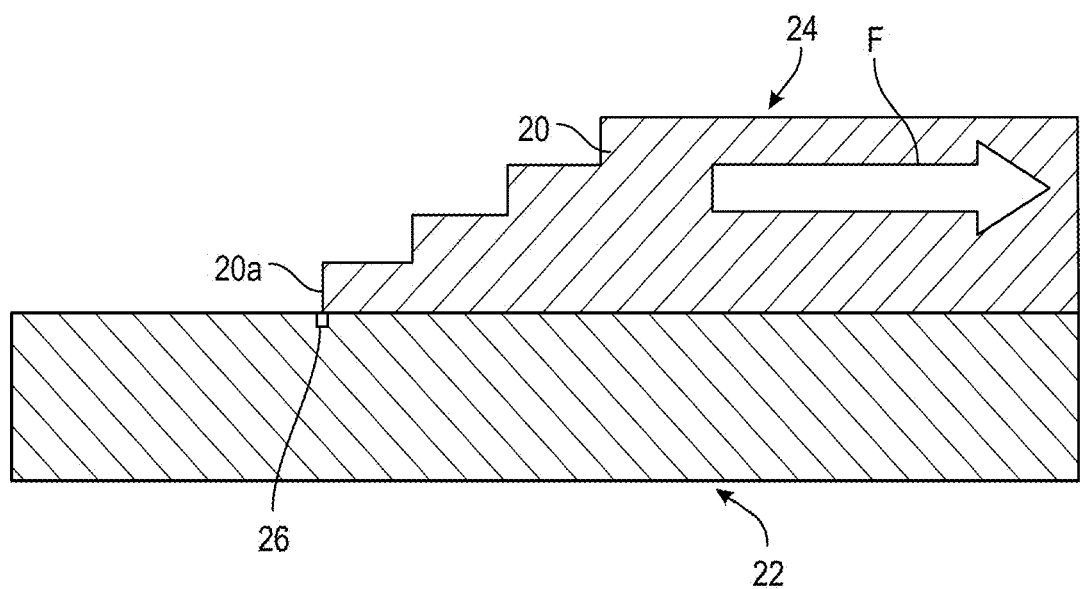
FIG. 3, also already discussed, is a very schematic cross-sectional view of a cloth being wound onto a moulding drum of the installation of FIG. 2.
Figure 4:
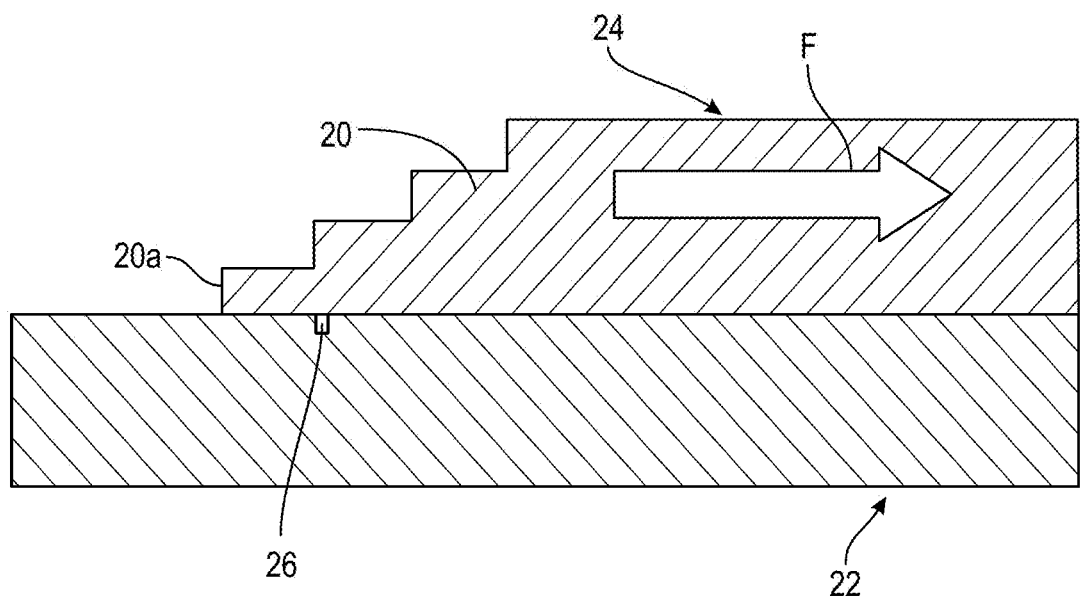
FIG. 4, already discussed, is a view similar to that of FIG. 3 and represents a problem of positioning the preform on the drum.

The drum 22 extends around a longitudinal axis X (FIG. 2). This axis X corresponds substantially to the axis A of revolution of the annular envelope 9 of the casing to be formed. The fibrous cloth 20 is adapted to be wound around the entire circumference of the drum 22.

It can be seen from FIG. 7 that the drum 22 comprises a cylindrical wall 22a extending between two annular flanges 22b, the abutment 30 being positioned on the cylindrical wall 22a and removably attached to the flanges 22b.

With reference to FIG. 8, the edge 20a of the fibrous cloth 20 and the abutment 30 are located at the mark 26 of the drum 22.

Advantageously, this abutment 30 rests against the edge 20a in a circumferential direction to the axis X of the drum 22. In other words, the edge 20a bears against the entire width of a bearing face of the abutment 30 in the circumferential direction of the drum 2.

In the event that the abutment 30 has one or more other functions, it would then comprise:
- visual markers 32 configured to be detected by a video camera, in which case the method would comprise, after step i), a step iii) of calibrating monitoring cameras of the winding by detecting these markers 32 (cf. FIG. 5); and/or
- a cutting guide 34, in which case the method would comprise, at the end of step b), a step iv) of cutting a second opposite longitudinal end of the cloth and the preform (see FIG. 5).

The abutment 30 may be metallic or plastic and could be made by additive manufacturing.

The invention claimed is:

1. A method for producing a casing made of a composite material for an aircraft turbine engine, this casing having an annular shape and comprising an annular fibrous preform formed by winding a fibrous cloth and embedded in a polymer matrix, the method comprising the steps of:
   a) positioning an edge of the fibrous cloth on a moulding drum, the fibrous cloth having a generally elongate shape and said edge being located at a first longitudinal end of the fibrous cloth,
   b) winding the fibrous cloth on the moulding drum over at least one turn so as to obtain the annular fibrous preform wound around the moulding drum,
   c) moulding the annular fibrous preform and hardening a resin which is injected into the annular fibrous preform or pre-impregnated on the annular fibrous preform,
   wherein the method comprises, before step a), a step i) of mounting a removable abutment on the moulding drum, and step a) comprises abutting said edge against this removable abutment,
   wherein the removable abutment extends between an annular flanges of the moulding drum and around a cylindrical wall of the moulding drum.

2. The method according to claim 1, wherein the method comprises, during step b), a step ii) of dismounting and removing the removable abutment from the moulding drum.

3. The method according to claim 1, wherein the moulding drum comprises a cylindrical wall extending between two annular flanges, the removable abutment being positioned on the cylindrical wall and removably attached to said flanges in step i).

4. The method according to claim 1, wherein, the removable abutment comprising visual markers configured to be detected by a video camera, the method comprises, after step i), a step iii) of calibrating monitoring cameras of the winding by detecting these markers.

5. The method according to claim 1, wherein, the removable abutment comprising a cutting guide, the method comprises, at the end of step b), a step iv) of cutting a second longitudinal end opposite of the fabric.

6. The method according to claim 1, wherein the removable abutment is made of metal, plastic, wood or composite.

7. The method according to claim 1, wherein the removable abutment is mounted in step i) so that said edge of the fibrous cloth can be aligned with a mark located on the moulding drum.

8. The method according to claim 7, wherein the mark is an engraving.

9. The method according to claim 7, wherein the mark is located on a cylindrical wall of the moulding drum.

10. A method for producing a casing made of a composite material for an aircraft turbine engine, said casing having an annular shape and comprising an annular fibrous preform formed by winding a fibrous cloth and embedded in a polymer matrix, the method comprising the steps of:
   a) positioning an edge of the fibrous cloth on a moulding drum, the fibrous cloth having a generally elongate shape and said edge being located at a first longitudinal end of the fibrous cloth,
   b) winding the fibrous cloth on the moulding drum over at least one turn so as to obtain the annular fibrous preform wound around the moulding drum,
   c) moulding the annular fibrous preform and hardening the resin which is injected into the annular fibrous preform or pre-impregnated on the annular fibrous preform,
   wherein the method comprises, before step a), a step i) of mounting a removable abutment on the moulding drum, and in that step a) comprises abutting said edge against this removable abutment,
   wherein the moulding drum extends around a longitudinal axis and comprises a cylindrical wall and a mark, the cylindrical wall extending between two annular flanges,
   the removable abutment is positioned on the cylindrical wall and removably attached to the annular flanges of the moulding drum, said removable abutment being positioned at the mark and resting against the edge of the fibrous cloth, and
   wherein the removable abutment extends between an annular flanges of the moulding drum and around a cylindrical wall of the moulding drum.

* * * * *